(12) United States Patent
Yang et al.

(10) Patent No.: US 9,719,005 B2
(45) Date of Patent: Aug. 1, 2017

(54) ASSOCIATED COPOLYMER AND PREPARATION METHOD THEREOF, AND DRILLING FLUID

(71) Applicants: China Petroleum & Chemical Corporation, Beijing (CN); Fushun Research Institute of Petroleum and Petrochemicals, SINOPEC CORP., Fushun, Liaoning (CN)

(72) Inventors: Chao Yang, Liaoning (CN); Zhizhi Zhang, Liaoning (CN); Xiaolei Sun, Liaoning (CN); Jiao Lu, Liaoning (CN); Zequn Yin, Liaoning (CN); Quanjie Liu, Liaoning (CN)

(73) Assignees: CHINA PETROLEUM & CHEMICAL CORPORATION, Beijing (CN); FUSHUN RESEARCH INSTITUTE OF PETROLEUM AND PETROCHEMICALS, SINOPEC CORP., Fushun, Liaoning (CN)

( * ) Notice: Subject to any disclaimer, the term of this patent is extended or adjusted under 35 U.S.C. 154(b) by 0 days.

(21) Appl. No.: 14/970,000

(22) Filed: Dec. 15, 2015

(65) Prior Publication Data
US 2017/0114264 A1 Apr. 27, 2017

(30) Foreign Application Priority Data
Oct. 21, 2015 (CN) .......................... 2015 1 0681433

(51) Int. Cl.
C09K 8/035 (2006.01)
C08F 220/56 (2006.01)
C08F 220/34 (2006.01)

(52) U.S. Cl.
CPC ............ *C09K 8/035* (2013.01); *C08F 220/34* (2013.01); *C08F 220/56* (2013.01)

(58) Field of Classification Search
None
See application file for complete search history.

(56) References Cited

U.S. PATENT DOCUMENTS 3,497,482 A 2/1970 Hwa
5,908,814 A 6/1999 Patel et al.
(Continued)

FOREIGN PATENT DOCUMENTS

CN 101412785 A 4/2009
CN 101955564 A 1/2011
(Continued)

OTHER PUBLICATIONS

Ruiping Peng, "AOD-1—A Calcium Resisting Fluid Loss Additive"; Petroleum Drilling Techniques, vol. 33, No. 4, Jul. 2005.
(Continued)

*Primary Examiner* — Jeffrey Washville
(74) *Attorney, Agent, or Firm* — Novick, Kim & Lee, PLLC; Allen Xue

(57) ABSTRACT

Disclosed are an associated copolymer, a method for preparation of a polymer and a polymer prepared with the method, a use of the associated copolymer and/or the polymer in drilling fluids, and a drilling fluid containing the associated copolymer and/or the polymer. The associated copolymer comprises acrylamide structural units, zwitter-ionic structural units, and cationic polyamine structural units at a specific proportion, and the cationic polyamine structural units have specific kinematic viscosity and cationic degree; thus, when the associated copolymer is used as a viscosity improver for drilling fluids, the obtained drilling fluid not only has favorable apparent viscosity after it is aged at a high temperature, but also has high dynamic shear force, and is resistant to high temperature up to 200° C. or above, resistant to NaCl up to saturated concentration, and resistant to $CaCl_2$ up to 20 wt % concentration.

18 Claims, 3 Drawing Sheets

(56) References Cited

U.S. PATENT DOCUMENTS

2010/0197530 A1  8/2010  Carman et al.
2010/0210724 A1  8/2010  Cadix et al.

FOREIGN PATENT DOCUMENTS

| CN | 102040707 A | 5/2011 |
| CN | 102127401 A | 7/2011 |
| CN | 102372818 A | 3/2012 |
| CN | 102464761 A | 5/2012 |
| CN | 103044679 A | 4/2013 |
| CN | 103113518 A | 5/2013 |
| CN | 103773332 A | 5/2014 |
| CN | 103923254 A | 7/2014 |
| CN | 104592957 A | 5/2015 |

OTHER PUBLICATIONS

Cheng Mao et al., "Research on Performances of Sulfobetaine Amphoteric Copolymer Salt Solution", Petroleum Drilling Techniques, vol. 28, No. 5, Sep. 2011.

Chang-Hai Li, "Synthesize of Zwitterionic Polvmers with Complex Initiation System", Chemical Industry and Engineering, vol. 28, No. 6, Nov. 2011.

ASSOCIATED COPOLYMER AND PREPARATION METHOD THEREOF, AND DRILLING FLUID

CROSS REFERENCE TO RELATED APPLICATION

This application claims priorities under 35 U.S.C §119 to Chinese Application No. 201510681433.2, entitled "Associated Copolymer and Preparation Method and Use Thereof, and Drilling Fluid", filed on Oct. 21, 2015, which is specifically and entirely incorporated by reference.

FIELD OF THE INVENTION

The present invention relates to an associated copolymer, a method for preparation of a polymer, and a drilling fluid containing the associated copolymer.

BACKGROUND OF THE INVENTION

In the drilling process, a viscosity improver is usually added to improve the viscosity of low-solid drilling fluid, to ensure the drilling fluid has high viscosity and favorable rheological property. All drilling fluid viscosity improvers are water-soluble polymers with a long molecular chain. Viscosity improvers are often used also as shale inhibitors (coaters), filtrate reducers, and flow pattern improvers, etc., besides taking a viscosity improving effect. Hence, using a viscosity improver is often helpful for improving the rheological property of the drilling fluid and improving the stability of the well wall. Drilling fluid viscosity improvers are one of the most important auxiliary drilling agents. They are mainly categorized into natural vegetable gum viscosity improvers and synthetic polymer viscosity improvers, and take an important role in ensuring safe use of drilling fluids and cuttings carrying, etc. However, existing drilling fluid viscosity improvers, such as xanthan gum and 80A51, etc., can't meet the requirements of construction at a high temperature satisfactorily. In most viscosity improvers, the viscosity improving effect is degraded quickly or even lost completely at a temperature higher than 150° C. In the aspect of resistance to salinity, resistance to high-concentration calcium chloride is an urgent problem to be solved in the drilling fluid field. Among viscosity improvers commonly used at present, there is hardly any polymer that is resistant to calcium chloride at concentration higher than 15%.

For example, the calcium-resistant polymeric viscosity improver disclosed in CN102372818A and CN102464761A, which is obtained mainly by introducing sulfonated groups or hydrophobic groups into an acrylamide polymer, can only meet the requirements for use at low temperatures (lower than 100° C.) at calcium ion concentration not higher than 2,000 mg/L. Though the high-temperature resistant viscosity improver disclosed in CN101955564A, CN103113518A and CN102127401A has significantly improved resistance to high temperature and can be used at temperatures higher than 200° C., the salinity and calcium resistance property is not mentioned in the documents, and, conjectured from the monomers and preparation method used in the viscosity improver, the salinity and calcium resistance property is not improved substantively.

In summary, among viscosity improvers for drilling fluids commonly used at present, it is often unable to make a balance between high-temperature resistance property and salinity and calcium resistance property.

SUMMARY OF THE INVENTION

To overcome the drawbacks in the prior art, the present invention provides an associated copolymer, and a preparation method of a polymer and a use of the associated copolymer. When the associated copolymer is used as a viscosity improver for drilling fluids, the obtained drilling fluid has apparently improved apparent viscosity, dynamic shear force, and high-temperature and salinity resistance properties.

The present invention provides an associated copolymer, comprising structural units A, structural units B and structural units C, wherein the structural unit A has a structure represented by the following formula (I):

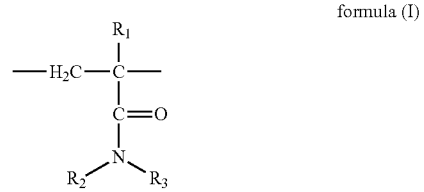

formula (I)

wherein, $R_1$, $R_2$, and $R_3$ independently are H, substituted or unsubstituted C1-C5 alkyl;

the structural unit B is a zwitter-ionic structural unit; preferably, the cation in the zwitter-ionic structural unit is $N^+$, and the anion in the zwitter-ionic structural unit is $SO_3^-$;

the structural unit C is an ionic associate of the structural unit B and cationic polyamine;

based on the total weight of the associated copolymer, content of the structural units A is 10-75 wt %, preferably 30-65 wt %; content provided by the zwitter-ionic structural unit is 15-65 wt %, preferably 20-60 wt %; content provided by cationic polyamine is 1-50 wt %, preferably 3-40 wt %; and the apparent viscosity of the associated copolymer is 40-60 mPa·s after it is aged at 200° C. for 16 h; preferably, the cation in the zwitter-ionic structural unit is $N^+$, and the anion in the zwitter-ionic structural unit is $SO_3^-$. In the second aspect of the present invention, a method for preparation of a polymer is provided, comprising the following steps:

(1) controlling a monomer a represented by the following formula (i) and a monomer b to have copolymerization under aqueous solution polymerization conditions, with an inorganic salt in presence, to obtain a viscous intermediate product, wherein, the monomer b is a zwitter-ionic monomer; preferably, the cation in the zwitter-ionic monomer is $N^+$, and the anion in the zwitter-ionic monomer is $SO_3^-$;

(2) controlling the viscous intermediate product obtained in step (1) to contact with the monomer c under association conditions, wherein the monomer c is cationic polyamine;

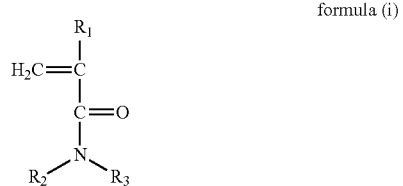

formula (i)

wherein, $R_1$, $R_2$, and $R_3$ independently are H, substituted or unsubstituted C1-C5 alkyl.

In the third aspect of the present invention, a polymer prepared with the method described above is provided.

In the fourth aspect of the present invention, a use of the above associated copolymer and/or polymer in drilling fluids is provided.

In the fifth aspect of the present invention, a drilling fluid comprising the above associated copolymer and/or polymer is provided.

The associated copolymer provided in the present invention contains acrylamide structural units, zwitter-ionic structural units, and cationic polyamine structural units at a specific proportion, and the cationic polyamine structural units have specific kinematic viscosity and cationic degree; thus, when the associated copolymer is used as a viscosity improver for drilling fluids, the obtained drilling fluid not only has favorable apparent viscosity after it is aged at a high temperature, but also has high dynamic shear force, and is resistant to high temperature up to 200° C. or above, resistant to NaCl up to saturated concentration, and resistant to $CaCl_2$ up to 20 wt % concentration.

With the method for preparation of a polymer provided in the present invention, acrylamide and a zwitter-ionic monomer are copolymerized to a certain degree, and then the copolymerized product is controlled to have a reaction with cationic polyamine at a specific proportion, with an inorganic salt in presence, so that the obtained associated copolymer can be used as a viscosity improver for drilling fluids, and the favorable effect described above can be obtained.

Compared with the prior art, the associated copolymer and the method for preparation of the associated copolymer provided in the present invention have the following advantages:

(1) In the method for preparation of an associated copolymer provided in the present invention, in the early stage of the reaction, a high-concentration inorganic salt solution is used, so that the sulfonic zwitter-ionic monomer is combined with the inorganic salt to form a special structure; owing to the existence of the metal ions in the inorganic salt, the structure of the sulfonic zwitter-ionic monomer is further extended, and thereby the steric hindrance among molecules is significantly decreased during polymerization, and the molecular arrangement in the monomer is more tight; thus, the molecular weight of the polymer is greatly increased. In the late stage of the reaction, by adding cationic polyamine with low molecular weight, the ammonium cations in the structure of the cationic polyamine with low molecular weight further react with the sulfonic groups in the zwitter-ionic monomer to form a more stable mesh structure and thereby improve the structural viscosity of the polymer; thus, the associated copolymer has favorable dynamic shear force as well as good apparent viscosity.

(2) The polymer prepared with the method disclosed in the present invention has long branched chains and rigid cyclic structure. In the water solution, the steric hindrance in the polymer is increased and the hydrodynamic volume of the polymer is increased owing to the existence of the long branched chains and rigid cyclic structure; thus, the tendency of fracture and hydrolysis of the polymer under temperature influence is decreased, and thereby the temperature resistance property of the polymer is improved. Hence, the polymer is resistant to high temperature up to 200° C.

Other aspects and advantages of the present invention will be further detailed in the embodiments hereunder.

BRIEF DESCRIPTION OF THE DRAWINGS

The accompanying drawings are provided here to facilitate further understanding on the present invention, and constitute a part of this document. They are used in conjunction with the following embodiments to explain the present invention, but shall not be comprehended as constituting any limitation to the present invention. Among the drawings.

DETAILED DESCRIPTION

Figure 1:
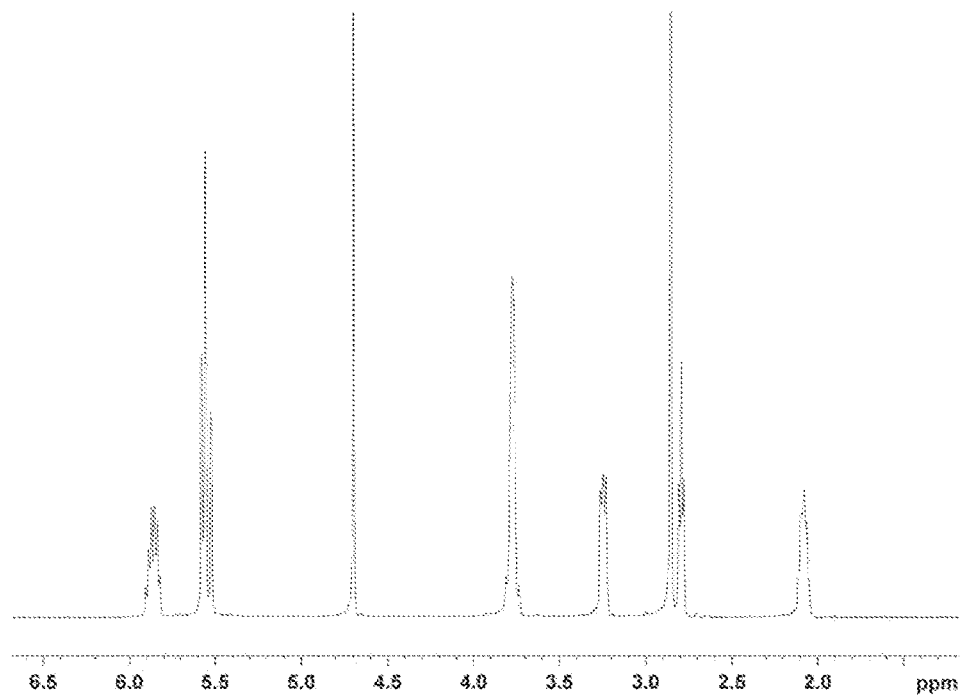
FIG. 1 and FIG. 2 are $^1$HNMR and $^{13}$CNMR spectrograms of MAPS respectively.

The associated copolymer according to the present invention comprises structural units A, structural units B and structural units C, wherein the structural unit A has a structure represented by the following formula (I):

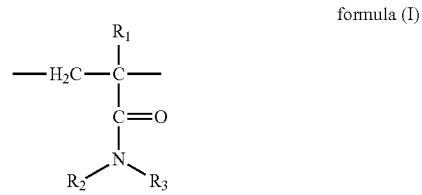

formula (I)

wherein, $R_1$, $R_2$, and $R_3$ independently are H, substituted or unsubstituted C1-C5 alkyl;

the structural unit B is a zwitter-ionic structural unit; preferably, the cation in the zwitter-ionic structural unit is $N^+$, and the anion in the zwitter-ionic structural unit is $SO_3^-$;

the structural unit C is an ionic associate of the structural unit B and cationic polyamine;

based on the total weight of the associated copolymer, content of the structural units A is 10-75 wt %, preferably 30-65 wt %; content provided by zwitter-ionic structural unit is 15-65 wt %, preferably 20-60 wt %; content provided by cationic polyamine is 1-50 wt %, preferably 3-40 wt %; preferably, the cation in the zwitter-ionic structural unit is $N^+$, and the anion in the zwitter-ionic structural unit is $SO_3^-$. Due to the limitation of testing means mastered by the present inventor and/or limitations of existing testing methods, for the content of the associative copolymer compositions of the present invention, the content of each structural unit can only be tested for the structural units corresponding to the monomer, and the content of the structure unit C cannot be measured, the amount of zwitterionic structural units involved in the association and without participating in the association cannot be tested either, thus the content provided by zwitterionic structural units above-mentioned include both the content of zwitterionic structural unit associated with cationic polyamines to form a structural unit C and that of zwitterionic structural unit having not associated with cationic polyamines to form a structural unit C, which corresponds to the content of the structural unit B. Also, the content provided by cationic polyamine includes the content both of cationic polyamine forming structural unit C and of cationic polyamine without forming structural unit C.

For the present invention, the above content can be calculated by the amount difference before reaction and after reaction or determined by NMR spectroscopy combined with infrared spectrum. For example, the content of zwitterionic structural unit can be calculated by the amount of the zwitterionic monomer input before reaction and remained after reaction or determined by NMR spectroscopy combined with infrared spectrum.

In the present invention, the associated copolymer refers to a polymer that contains structures formed through copolymerization as well as structures formed through ionic association, wherein, the structural units A and the structural units B are formed through copolymerization, while the structural unit C is formed by the structural unit B and cationic polyamine through ionic association. In the structural formulae, the dotted line " . . . " represents ionic association.

In the present invention, the C1-C5 alkyl can be one or more of methyl, ethyl, n-propyl, iso-propyl, n-butyl, iso-butyl, tert.-butyl, n-pentyl, iso-pentyl, tert.-pentyl, and neo-pentyl. For example, the substituent of the C1-C5 alkyl can be halogen or hydroxyl.

According to a preferred embodiment of the present invention, in the structural unit A represented by formula (I), $R_1$ is H, and $R_2$ and $R_3$ independently are H or methyl.

According to an embodiment of the present invention, the structural unit B is at least one of the structures represented by the following formulae (II-1), (II-2) and (II-3):

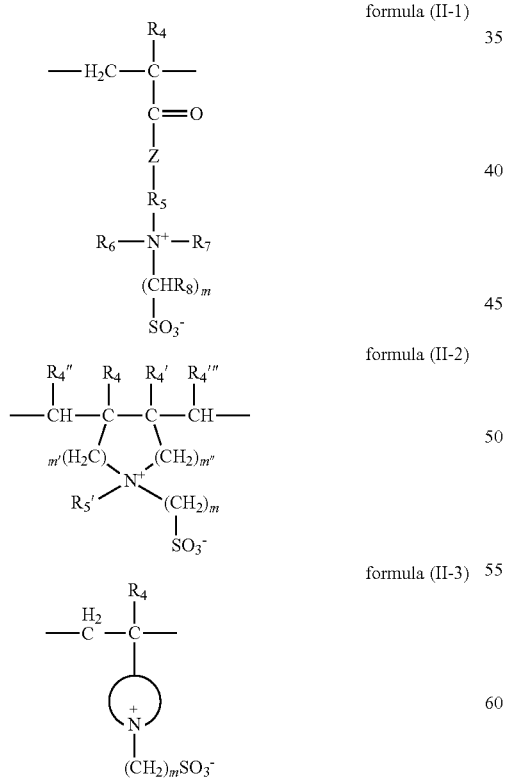

More preferably, the structural unit B is at least one of the structures represented by the following formulae (II-1-1), (II-2-1) and (II-3-1):

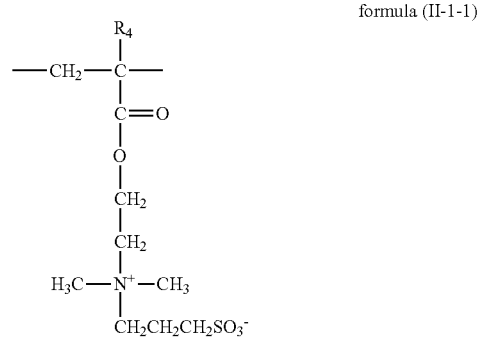

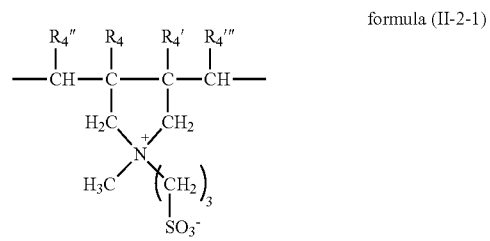

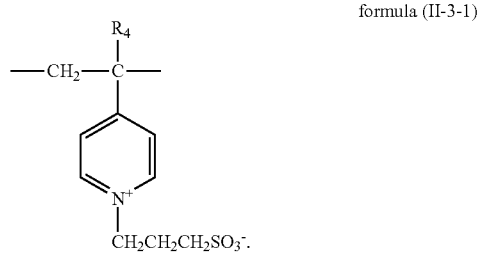

For the above formula, $R_4$, $R_4'$, $R_4''$, $R_4'''$ and $R_5'$ independently are H, substituted or unsubstituted C1-C5 alkyl; Z is O or NH; $R_5$ is C2-C5 alkylene or C6-C10 arylene;

$R_6$ and $R_7$ independently are H, substituted or unsubstituted C1-C5 alkyl;

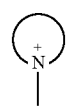

cycle is azacyclo bonded with $(CH_2)_m SO_3^-$ via N atom; azacyclo is such as pyridine ring, imidazole ring, pyrazole ring or quinolone; m' and m" independently are an integer within the range of 1-2; m is an integer within the range of 1-5, preferably an integer within the range of 1-3, more preferably 2 or 3.

In the associated copolymer according to the present invention, wherein, the structural unit C is at least one of the structures represented by the following formulae (III-1), (III-2) and (III-3):

formula (III-1)

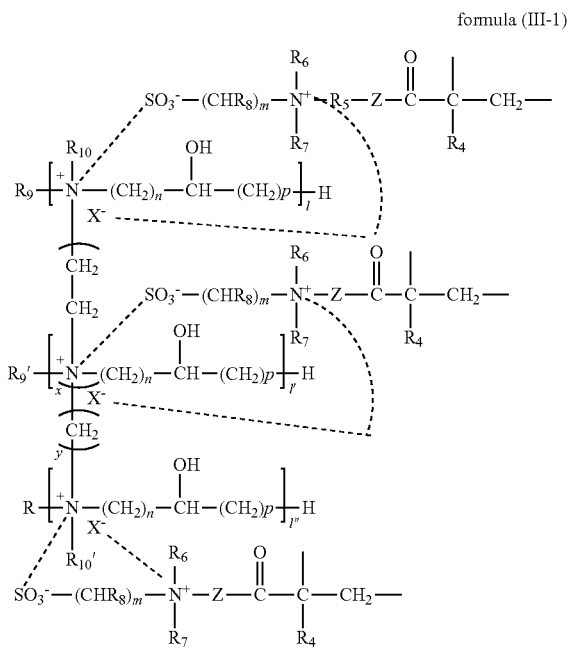

formula (III-2)

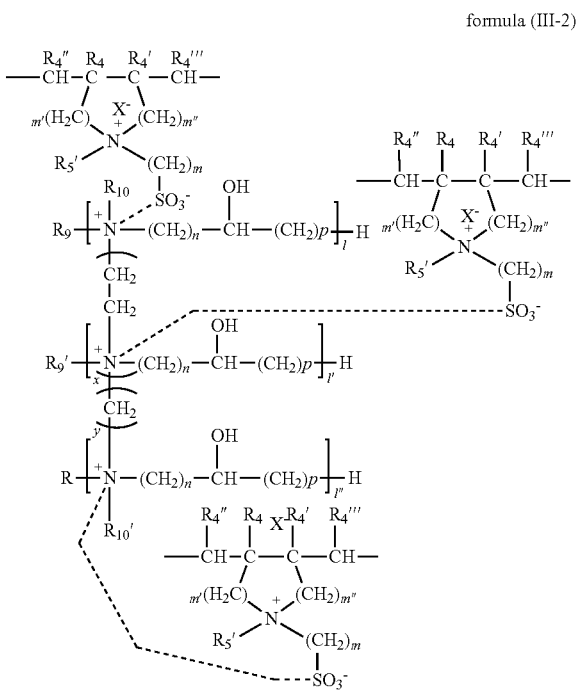

formula (III-3)

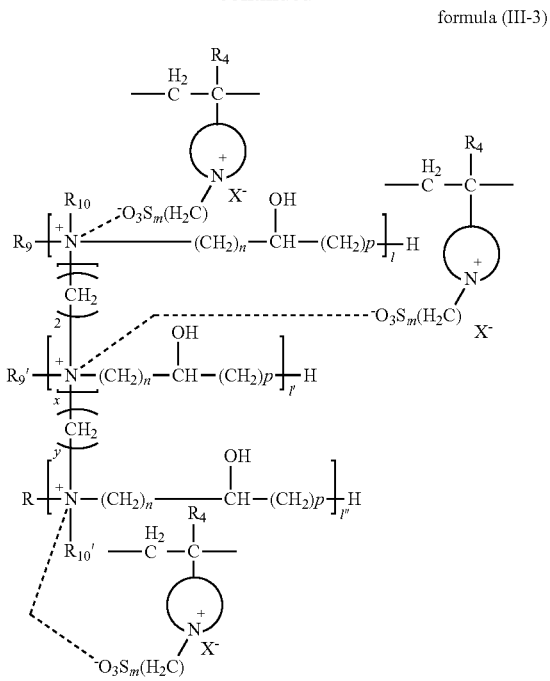

wherein, $X^-$ is an inorganic anion; $R$, $R_9$, $R_9'$, $R_{10}$ and $R_{10}'$ independently are the structure represented by the following formula (IV), respectively:

$$\text{—}(\text{CH}\text{—}(\text{CH}_2)_t\text{—}\text{O})_z\text{—}\overset{R_{11}}{\text{CH}}\text{—}(\text{CH}_2)_t\text{—}\text{OH},\quad\text{formula (IV)}$$

wherein, $R_{11}$ is H, substituted or unsubstituted C1-C5 alkyl; t is an integer within the range of 1-5; and z is an integer within the range of 0-5; n and p independently are an integer within the range of 1-5; x is an integer within the range of 0-10; y an integer within the range of 1-10; the values of 1, 1' and 1" ensure that the kinematic viscosity of the cationic polyamine is 100-500 mm²/s preferably 150-450 mm²/s and the cationic degree of the cationic polyamine is 0.5-2 mmol/g preferably 0.5-1.5 mmol/g. In the structural unit C, the dotted line " . . . " represents ionic association.

The cationic polyamine can be any polyamine that has multiple nitrogen cations and corresponding balancing anions, and the cationic polyamine is obtained through a condensation reaction among amine represented by the formula (V), cyclic ether represented by the formula (VI), and epoxy haloalkane represented by the formula (VII):

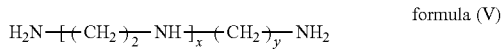
formula (V)

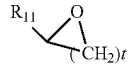
formula (VI)

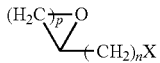
formula (VII)

wherein, t, n and p independently are an integer within the range of 1-5; x is an integer within the range of 0-10; y is an integer within the range of 1-10. When x=0, formula (V) represents diamine, y is preferably an integer within the range of 1-7; and when x≠0, formula (V) represents polyethylenepolyamine, x is an integer within the range of 1-10. Definition of the other substituents and subscripts is the same as that described above.

According to the associated copolymer provided in the present invention, preferably, the weight-average molecular weight of the associated copolymer is 500,000-5,000,000, more preferably is 1,000,000-3,000,000.

According to the associated copolymer provided in the present invention, the structural unit A and the structural unit B are combined through conventional covalent polymerization, i.e., they are bonded by covalent bonds; the structural unit C becomes a structural unit of the associated copolymer through ionic association between the cation and anion of the structural unit C and the cation and anion of the structural unit B respectively, and thereby introduces a mesh structure into the associated copolymer; thus, the associated copolymer has high dynamic shear force and high temperature and salinity resistance properties. The ionic association effect can be conjectured from the great difference between the associated copolymer of structural unit A and structural unit B and a mixture obtained by simply mixing the copolymer of structural unit A and structural unit B with cationic polyamine in dynamic shear force and temperature and salinity resistance measured under the same conditions, in conjunction with the chemical principle.

The method for preparation of a polymer according to the present invention comprises the following steps:
(1) controlling a monomer a represented by the following formula (i) and a monomer b to have copolymerization under aqueous solution polymerization conditions, with an inorganic salt in presence, to obtain a viscous intermediate product, wherein, the monomer b is a zwitter-ionic monomer; preferably, the cation in the zwitter-ionic monomer is $N^+$, and the anion in the zwitter-ionic monomer is $SO_3^-$;
(2) controlling the viscous intermediate product obtained in step (1) to contact with the monomer c under association conditions, wherein, the monomer c is cationic polyamine;

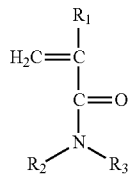

formula (i)

wherein, $R_1$, $R_2$, and $R_3$ independently are H, substituted or unsubstituted C1-C5 alkyl; preferably, $R_1$ is H, and $R_2$ and $R_3$ are independently H or methyl.

The substituents and other parameters in the monomer correspond to those in the structural units described above. Hence, they are not detailed here anymore. Hereunder the unique characteristics of the preparation method for the associated copolymer will be mainly described.

According to the method for preparation of a polymer provided in the present invention, a main function of the inorganic salt is to provide an environment for exchange/association between the anion and cation in the zwitter-ionic structural unit and the cation and anion in the cationic polyamine. Hence, any inorganic salt can be used as the inorganic salt in the present invention, as long as it can provide such an environment. Preferably, the inorganic salt is one or more of ammonium salt, calcium salt, magnesium salt, copper salt, zinc salt, aluminum salt, and zirconium salt. Preferably, the inorganic salt is used in solution form.

Through research, the inventor has further found: for different types of inorganic salts, the solution concentration required to attain an optimal effect is different. For example, in the case that the inorganic salt is an ammonium salt, the concentration of the inorganic salt solution preferably is 10 wt %-30 wt %; in the case that the inorganic salt is an calcium salt, magnesium salt, copper salt, or zinc salt, the concentration of the inorganic salt solution preferably is 5%-15%, more preferably is 10%-15%; in the case that the inorganic salt is an aluminum salt, the concentration of the inorganic salt solution preferably is 2 wt %-10 wt %; in the case that the inorganic salt is an zirconium salt, the concentration of the inorganic salt solution preferably is 2 wt %-5 wt %. For the concentration of the inorganic salt solution, only the quantity of the inorganic salt and the quantity of the solvent are taken into account, excluding the quantities of other materials, such as monomers.

In the case that the inorganic salt is an ammonium salt, specifically it can be one or more of ammonium chloride, ammonium bromide, and ammonium nitrate; in the case that the inorganic salt is an calcium salt, specifically it can be calcium chloride or calcium bromide; in the case that the inorganic salt is a magnesium salt, specifically it can be one or more of magnesium chloride, magnesium bromide, magnesium sulfate, and magnesium nitrate; in the case that the inorganic salt is an aluminum salt, specifically it can be one or more of aluminum chloride, aluminum bromide, aluminum sulfate, and aluminum nitrate; in the case that the inorganic salt is a copper salt, specifically it can be one or more of copper chloride, copper bromide, copper sulfate, and copper nitrate; in the case that the inorganic salt is a zinc salt, specifically it can be one or more of zinc chloride, zinc bromide, and zinc nitrate; in the case that the inorganic salt is a zirconium salt, specifically it can be one or more of zirconium chloride, zirconium bromide, zirconium oxychloride, and zirconium nitrate.

According to the method for preparation of a polymer provided in the present invention, preferably, the copolymerization in step (1) is carried out under inert gas protection, and the conditions of the copolymerization include: copolymerization temperature being 40-60° C. and copolymerization time being 0.5-2 h.

According to the method for preparation of a polymer provided in the present invention, the step (1) is executed with an initiator in presence. The type and amount of the initiator can be determined with reference to the prior art. Preferably, the initiator can be one or more of sodium persulfate, potassium persulfate, and ammonium persulfate. The amount of the initiator preferably is 0.3-0.7 wt % of the total weight of the monomers.

In the step (1), the concentration of the monomer preferably is 5-20 wt %.

In order to obtain a drilling fluid with better properties, preferably, based on the total weight of the monomer a, monomer b and monomer c, the amount of the monomer a is 10-75 wt %, preferably 30-65 wt %; the amount of the monomer b is 15-65 wt %, preferably 20-60 wt %; and the amount of the monomer c is 1-50 wt %, preferably 3-40 wt %.

According to a preferred embodiment of the present invention, the zwitter-ionic monomer is in one or more of the structures represented by the following formulae (ii-1), (ii-2), and (ii-3):

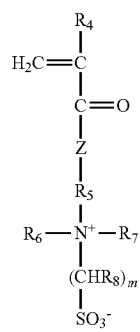
formula (ii-1)

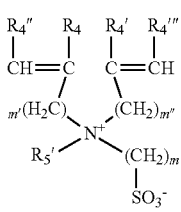
formula (ii-2)

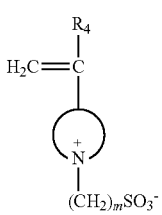
formula (ii-3)

wherein, $R_4$, $R_4'$, $R_4''$, $R_4'''$ and $R_5'$ independently are H, substituted or unsubstituted C1-C5 alkyl; Z is O or NH; $R_5$ is C2-C5 alkylene or C6-C10 arylene; $R_6$ and $R_7$ independently are H, substituted or unsubstituted C1-C5 alkyl;

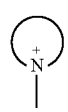

cycle is azacyclo bonded with $(CH_2)_m SO_3^-$ via N atom; m' and m'' independently are an integer within the range of 1-2; m is an integer within the range of 1-5, preferably an integer within the range of 1-3, more preferably 2 or 3.

More preferably, the zwitter-ionic monomer is at least one of the structures represented by the following formulae (ii-1-1), (ii-2-1) and (ii-3-1):

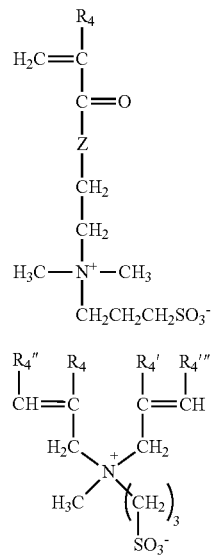
formula (ii-1-1)

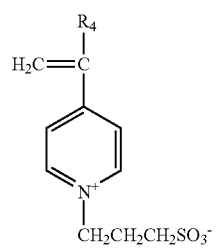
formula (ii-2-1)

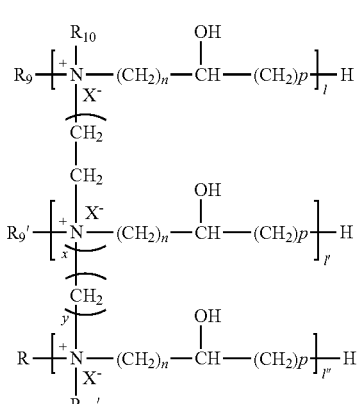
formula (ii-3-1)

wherein, $R_4$, $R_4'$, $R_4''$, $R_4'''$ are same or different, and independently are H, substituted or unsubstituted C1-C5 alkyl, Z is O or NH, preferably O.

Preferably, the cationic polyamine has the structure represented by the following formula (iii):

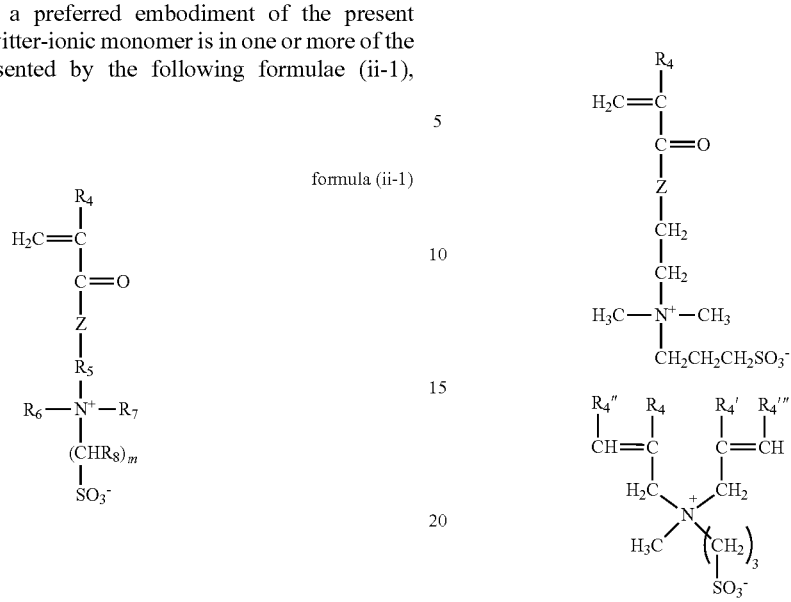
formula (iii)

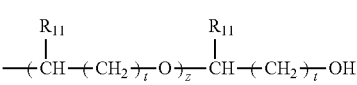
formula (IV)

wherein, $X^-$ is an inorganic anion; R, $R_9$, $R_9'$, $R_{10}$ and $R_{10}'$ are the structure represented by the following formula (IV), respectively; $R_{11}$ is H, substituted or unsubstituted C1-C5 alkyl, t is an integer within the range of 1-5, and z is an integer within the range of 0-5; n and p each is an integer within the range of 1-5, x is an integer within the range of 0-10, y is an integer within the range of 1-10; the values of 1, 1' and 1" ensure that the kinematic viscosity of the cationic polyamine is 100-500 mm$^2$/s and the cationic degree of the cationic polyamine is 0.5-2 mmol/g.

The monomer c can be prepared with the method for preparation of a cationic polyamine polymer disclosed in CN103773332A through a polymerization reaction among amine, cyclic ether, and epoxy haloalkane showed as above. Specifically, the cationic polyamine can be obtained through the following steps: adding the cyclic ether in droplets into the amine at 50-120° C. while stirring, at a mole ratio of the cyclic ether to the amine equal to 2-4:1, and keeping reaction for 1-4 h after the dropwise adding; then, heating up to 80-150° C., adding the epoxy haloalkane in droplets while stirring, at a mole ratio of the epoxy haloalkane to the amine equal to 0.2-0.7:1, and keeping reaction for 1-4 h after the dropwise adding; finally, terminating the reaction.

It should be noted that the temperature after heating must be higher than the temperature before heating, though there is partial overlap between the temperature range before heating (50-120° C.) and the temperature range after heating (80-150° C.).

The reaction can be terminated by adding hydrochloric acid. The amount of hydrochloric acid added in the reaction preferably is: hydrochloric acid: amine=1-3:1 (mole ratio).

Preferably, the amine is one or more of ethylene diamine, propylene diamine, butane diamine, hexamethylene diamine, diethylene triamine, triethylene tetramine, and tetraethyl ene pentamine. Preferably, the cyclic ether is one or more of epoxy ethane, epoxy propane, and tetrahydrofuran. Preferably, the epoxy haloalkane is one or more of epoxy chloropropane, epoxy bromopropane, and epoxy chlorobutane.

However, to ensure association and obtain better drilling fluid properties, the kinematic viscosity of the cationic polyamine should be controlled at 100-500 mm$^2$/s, and the cationic degree should be controlled at 0.5-2 mmol/g. The kinematic viscosity and cationic degree can be controlled within the above ranges by controlling the amount of the cyclic ether and the amount of the epoxy haloalkane. Generally, the mole ratio of the amine to the cyclic ether is controlled at 1:2-4. The mole ratio of the amine to the epoxy haloalkane is controlled at 1:0.2-0.7. Other reaction conditions and operations can be determined with reference to the prior art.

The cationic polyamine preferably is used in water solution form, and the concentration of the cationic polyamine solution preferably is 0.5-3 wt %, wherein, the amount of water is the total amount of water in the reaction system.

According to the method provided in the present invention, preferably, the contact conditions in step (2) include: copolymerization temperature being 50-70° C. and copolymerization time being 3-5 h. According to the method provided in the present invention, preferably, the method further comprises: washing the product obtained in step (2) with acetone, and drying and grinding the solid precipitate obtained after washing; thus, the obtained polymer is a product that can be used as a viscosity improver for drilling fluids. The purpose of washing with acetone is to remove unreacted components; the drying temperature can be 100-120° C., and the drying time can be 16-24 h.

According to a preferred embodiment of the present invention, the method for preparation of an associated copolymer provided in the present invention comprises the following steps:

(1) mixing an inorganic salt with water, to prepare 2 wt %-30 wt % inorganic salt solution;

(2) mixing cationic polyamine with water to prepare cationic polyamine solution, the mass concentration of which is 0.5%-3%;

(3) mixing the zwitter-ionic monomer and acrylamide monomer with the inorganic salt solution prepared in step (2), the total mass concentration of zwitter-ionic monomer and an acrylamide monomer is 5%-20%, and based on the total weight of the monomer a, monomer b and monomer c, the amount of the monomer a is 10-75 wt %, preferably 30-65 wt %; the amount of the monomer b is 15-65 wt %, preferably 20-60 wt %; and the amount of the monomer c is 1-50 wt %, preferably 3-40 wt %; filling N$_2$ into the solution for deoxidization for 0.5-1 h after the materials are dissolved fully, while heating up the solution to 40-60° C.; keeping reaction for 5-10 min. at the temperature, and then adding an initiator and keeping reaction for 0.5-2 h;

(4) adding the cationic polyamine solution prepared in step (2) into the reaction product in step (4), mixing the materials to a homogeneous state while heating up to 50-70° C., and holding for 3-5 h for reaction;

(5) washing the reaction product obtained in step (4) with acetone solution, and drying and grinding the solid precipitate obtained after washing, so as to obtain a viscosity improver.

In the method disclosed in the present invention, the zwitter-ionic monomer is preferably the sulfonic zwitter-ionic monomer, specifically, the sulfonic zwitter-ionic monomer can be one or more of N-methyldiallyl propanesulfonate (MAPS), N,N-dimethyl-methylacryloyloxyethyl propanesulfonate (DMAPS), and vinyl pyridine propanesulfonate (VPPS). The polymer may contain several types of sulfonic zwitter-ionic monomers. In the case that the viscosity improver contains two or more types of sulfonic zwitter-ionic monomers, the sulfonic zwitter-ionic monomers can be added in a quantity determined by the molecular weight; for example, in the case that the viscosity improver contains two types of sulfonic zwitter-ionic monomers, the mole ratio of the monomer with higher molecular weight to the monomer with lower molecular weight can be (5-7):(3-5). In the case that the viscosity improver contains three types of sulfonic zwitter-ionic monomers, the mole ratio of the three monomers in an order from higher molecular weight to lower molecular weight can be (1-2):(2-4):(4-7). In the case that the viscosity improver contains two or more sulfonic zwitter-ionic monomers, those skilled in the art can easily determine the proportion of each monomer on the basis of their knowledge in the art. In the method disclosed in the present invention, the MAPS can be synthesized through the following steps: take N-methyldiallylamine and 1,3-propane sultone at 2:1-9:1 mole ratio, preferably at 2.5:1-8:1 mole ratio, and add the 1,3-propane sultone into the N-methyldiallylamine; then, keep reaction at 20-90° C. temperature for 0.5-4 h, preferably keep reaction at 60-80° C. temperature for 1-3 h; next, filt, extract, and dry, so as to obtain the N-methyldiallyl propanesulfonate. The 1,3-propane sultone can be added into the N-methyldiallylamine by dropwise adding, or can be directly added into the N-methyldiallylamine in one operation. Preferably, the 1,3-propane sultone is added in one operation. In the case of adding in one operation, the mole ratio of the N-methyldiallylamine to the 1,3-propane sultone preferably is 5.2:1-7.8:1; in the case of dropwise adding, the mole ratio of the N-methyldiallylamine to the 1,3-propane sultone preferably is 2.5:1-5:1, and the 1,3-propane sultone can be heated to melted state before it is added by dropwise adding. The extraction solvent can be methanol or ethanol, preferably is ethanol; the extraction time can be 1-3 h, the drying temperature can be 30-50° C., and the drying time can be 10-20 h.

In the method disclosed in the present invention, the VPPS can be synthesized through the following steps: take 4-vinyl pyridine and 1,3-propane sultone at 1:1.1-1:1.3 mole ratio; take an organic solvent, at a ratio of the mass of the organic solvent to the total mass of the 4-vinyl pyridine and 1,3-propane sultone equal to 2:1-8:1; take an auxiliary agent at a ratio of the mass of the auxiliary agent to the total mass of the 4-vinyl pyridine, 1,3-propane sultone and organic solvent equal to 0.1 wt %-1 wt %; divide the organic solvent into three parts evenly, and dissolve the 4-vinyl pyridine, 1,3-propane sultone, and auxiliary agent in the three parts respectively; load the three mixed solutions into a reactor sequentially, and hold at 20-90° C. for 1-10 h for reaction; then, filter, wash, and dry, so as to obtain the 4-vinyl pyridine propanesulfonate.

According to another aspect of the present invention, a polymer prepared with the method described above is provided. In the polymer prepared with the method described above, the proportions of the structural units are determined through calculation on the basis of the material input and remained. The polymer prepared with the method described above has high temperature and salinity resistance property and improved dynamic shear force, etc.

The present invention further provides a use of the above associated copolymer and/or polymer in drilling fluids.

Preferably, the associated copolymer and/or the polymer are/is used as a viscosity improver in drilling fluids.

Based on the total weight of the drilling fluid, the content of the associated copolymer and/or the polymer in the drilling fluid is 0.5-5 wt %.

Hereunder the present invention will be further detailed in some embodiments. In the following embodiments, the kinematic viscosity is measured as per GB/T 265 Petroleum Products—Determination of Kinematic Viscosity and Calculation of Dynamic Viscosity; the cationic degree is measured with a colloid titration method; the apparent viscosity and dynamic shear force are measured with a six-speed rotational viscometer. Wherein, the dynamic shear force represents the structural viscosity in the system. The higher the dynamic shear force is, the higher the cuttings suspension performance of the drilling fluid is. In the following embodiments, the proportions of the structural units in the polymer can be determined through calculation on the basis of the material input and remained.

The sulfonic zwitter-ionic monomers used in the following examples and comparative examples are MAPS, DMAPS, and VPPS, which are prepared with the following methods:

The MAPS monomer used in the following examples and comparative examples can be prepared with the following method:

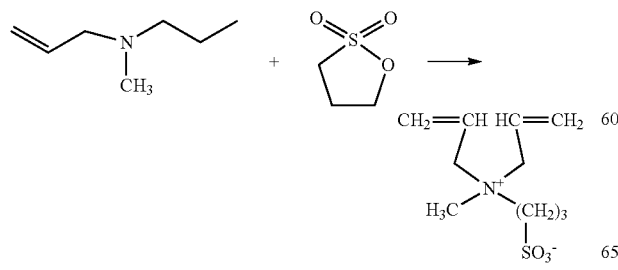

Figure 2:
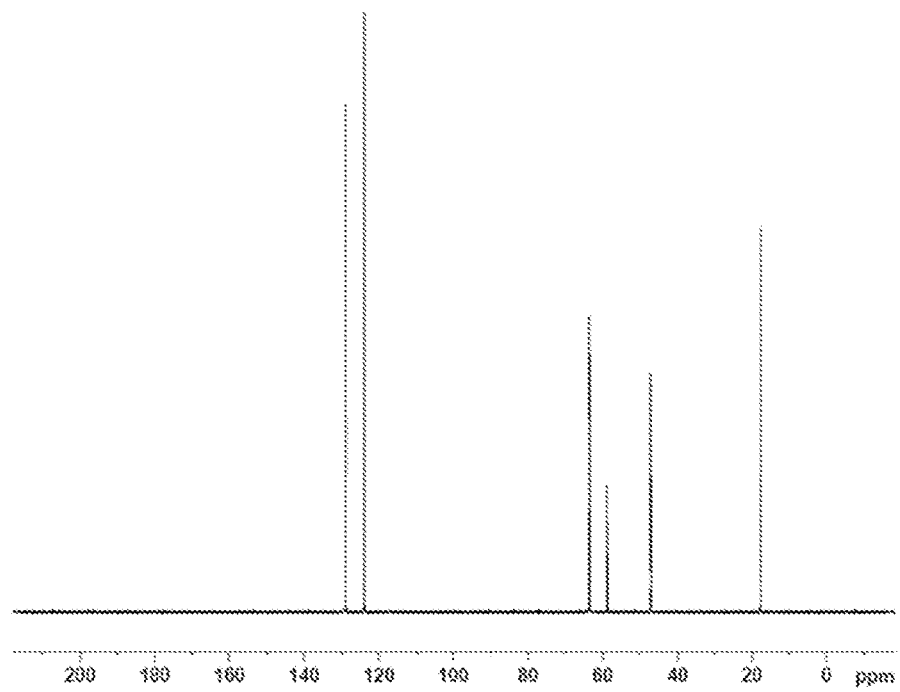

Weigh 650 g N-methyldiallylamine and load it into a reactor, and then place the reactor in thermostat water bath, and heat up while stirring. Weigh 122 g 1,3-propane sultone and directly add it into the N-methyldiallylamine, and then stir for 3 h at 80° C. reaction temperature, so as to obtain a crude MAPS product. Transfer the crude MAPS product onto a large sheet of filter paper and wrap it with the filter paper, load the crude MAPS product wrapped in the filter paper into a Soxhlet extractor, and extract for 3 h with ethanol; place the filter paper pack into a drying oven after extraction, and dry at 50° C.; finally, a pure MAPS monomer is obtained. The $^1$HNMR and $^{13}$CNMR spectrograms of the MAPS are shown in FIG. 1 and FIG. 2 respectively.

The DMAPS monomer used in the following examples and comparative examples can be prepared with the following method:

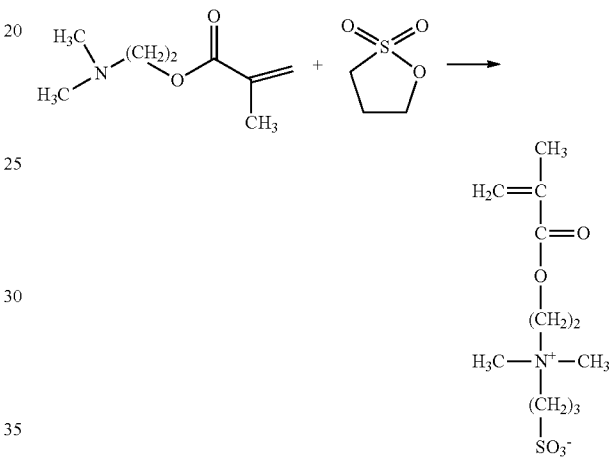

Figure 3:
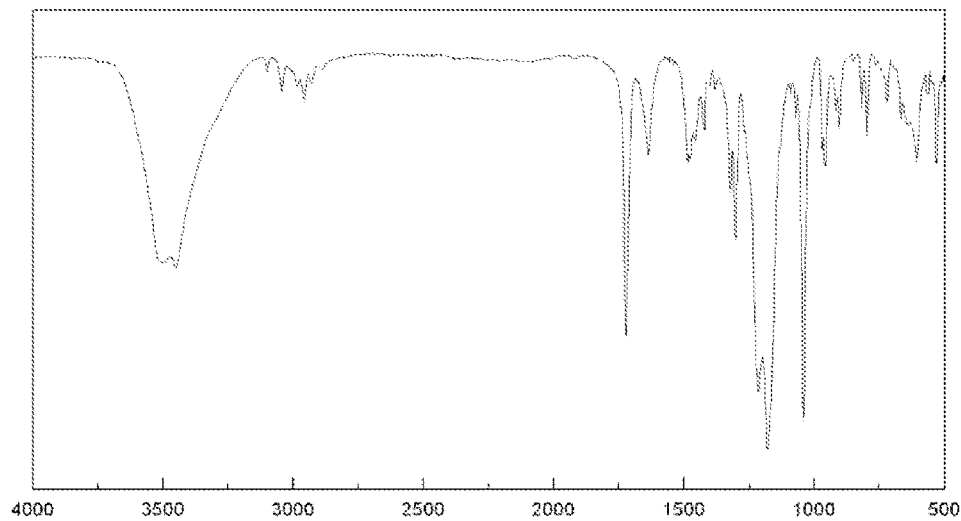
FIG. 3 and FIG. 4 are infrared spectrogram and $^1$HNMR spectrogram of DMAPS respectively.
Figure 4:
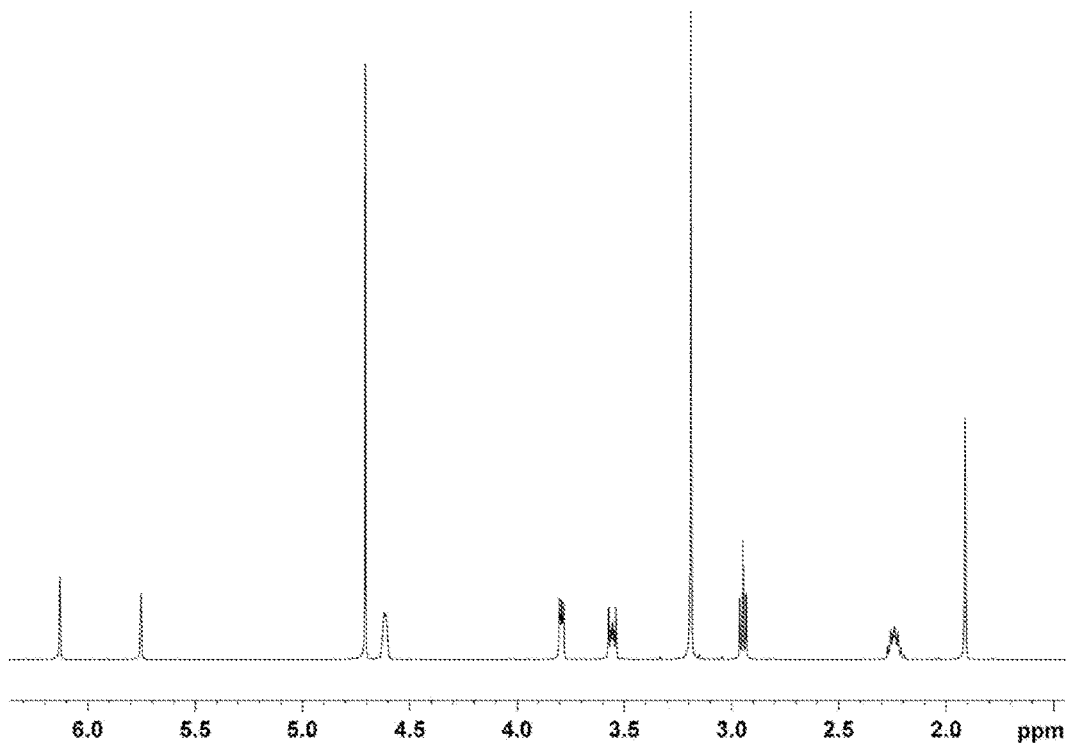

Weigh 785 g dimethylaminoethyl methacrylate and load it into a reactor, and then place the reactor in thermostat water bath, and heat up while stirring. Weigh 122 g 1,3-propane sultone and directly add it into the dimethylaminoethyl methacrylate, and then stir for 2 h at 55° C. reaction temperature, so as to obtain a crude DMAPS product. Transfer the crude DMAPS product onto a large sheet of filter paper and wrap it with the filter paper, load the crude DMAPS product wrapped in the filter paper into a Soxhlet extractor, and extract for 2.5 h with ethanol; place the filter paper pack into a drying oven after extraction, and dry at 35° C.; finally, a pure DMAPS monomer is obtained. The infrared spectrogram and $^1$HNMR spectrogram of the DMAPS are shown in FIG. 3 and FIG. 4 respectively.

The VPPS monomer used in the following examples and comparative examples can be prepared with the following method:

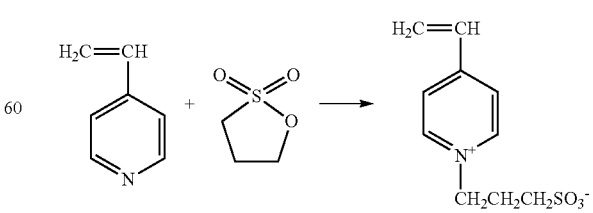

Figure 5:
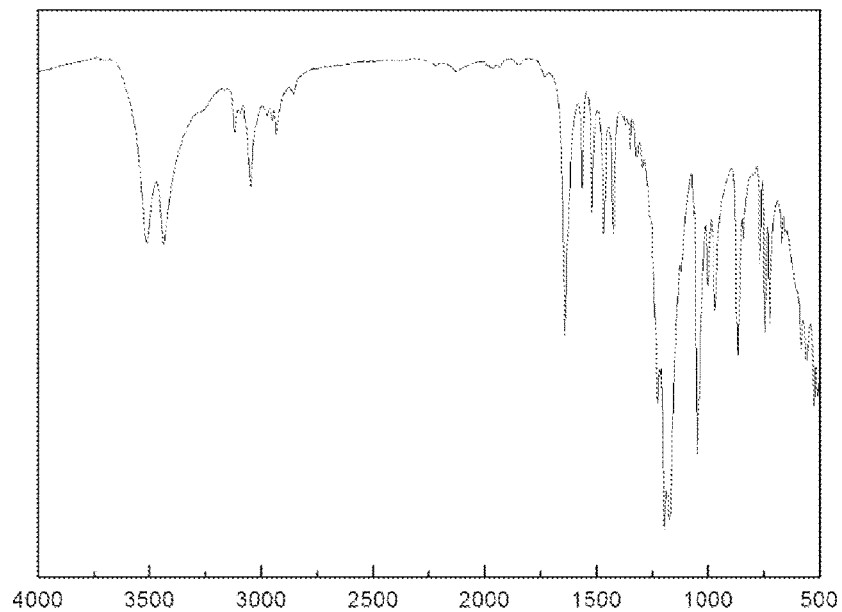
FIG. 5 and FIG. 6 are infrared spectrogram and $^1$HNMR spectrogram of VPPS respectively.
Figure 6:
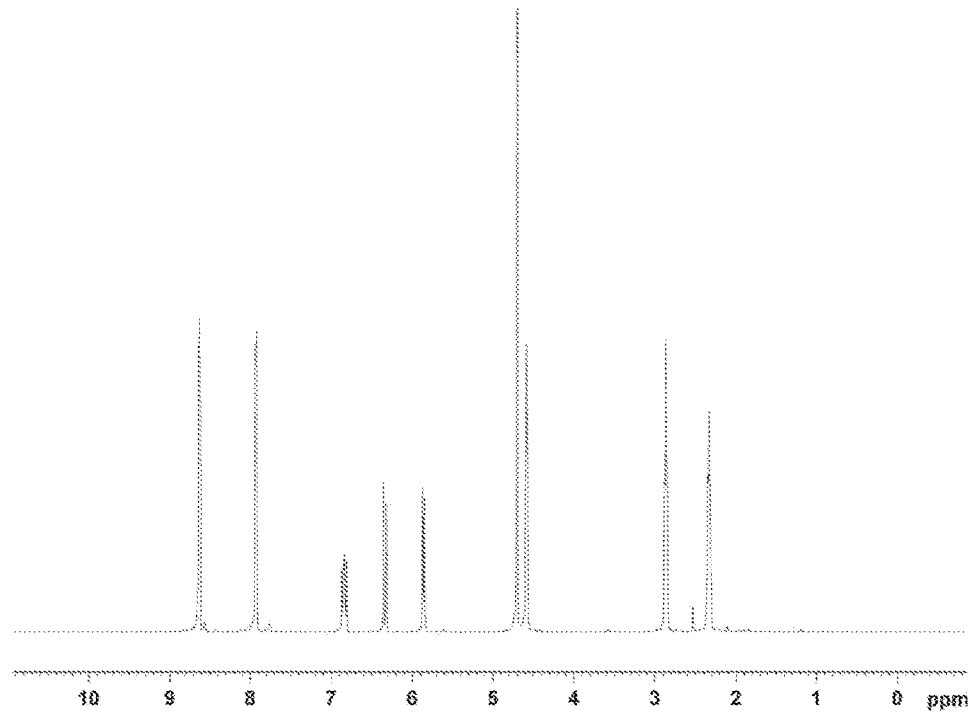

Weigh 105 g 4-vinyl pyridine, 125 g 1,3-propane sultone, 500 g benzene organic solvent, and 0.75 g diethyl hydroxylamine respectively; divide the benzene organic solvent into three parts evenly, and dissolve the 4-vinyl pyridine, 1,3-propane sultone, and diethyl hydroxylamine in the three parts respectively; load the three mixed solutions into a reactor sequentially, and hold at 70° C. for 2 h for reaction; then, carry out vacuum filtering, wash with benzene for 2-3 cycles, and dry for 15 h at 50° C.; thus, 213.6 g 4-vinyl pyridine propanesulfonate is obtained. The infrared spectrogram and $^1$HNMR spectrogram of the 4-vinyl pyridine propanesulfonate are shown in FIG. 5 and FIG. 6 respectively. The cationic polyamines used in the following examples and comparative examples are prepared with the following method:

gradually, control the reaction temperature at 90-150° C., wait till a thickening phenomenon occurs in the reaction system, keep reaction for at least half an hour, and then add hydrochloric acid at a mole ratio of hydrochloric acid to ethylene diamine equal to 2:1; then, keep reaction for 4 h; thus, cationic polyamine 1 is obtained. The kinematic viscosity of cationic polyamine 1 is 330 mm$^2$/s, and the cationic degree of cationic polyamine 1 is 1.8 mmol/g.

Add 60 g hexamethylene diamine in a 1,000 mL four-neck round flask, heat up to 70° C. while stirring, add 116 g epoxy ethane in droplets gradually, control the reaction temperature at 60-100° C., and keep reaction for 1 h; then, heat up to 95° C., add 185 g epoxy bromopropane in droplets

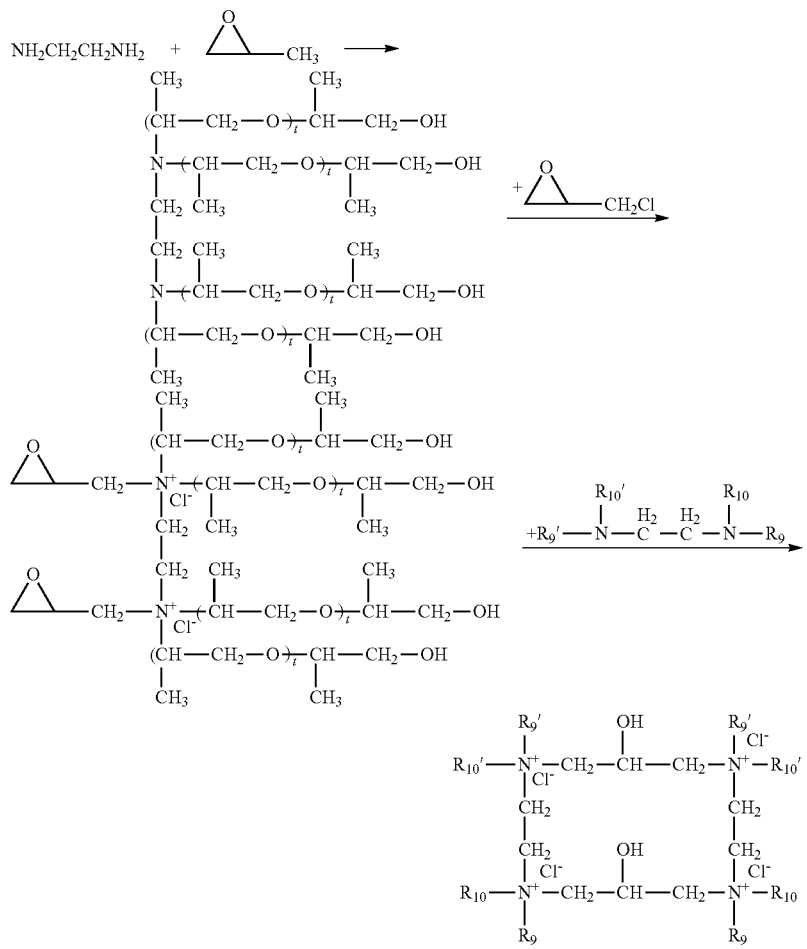

wherein, $R_9$, $R_9'$, $R_{10}$ and $R_{10}'$ independently are structure represented by formula (IV-1)

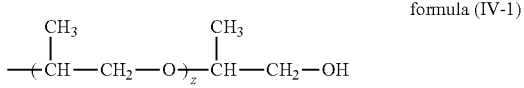

formula (IV-1)

Add 60 g ethylene diamine in a 1,000 mL four-neck round flask, heat up to 70° C. while stirring, add 116 g epoxy propane in droplets gradually, control the reaction temperature at 60-100° C., and keep reaction for 1 h; then, heat up to 95° C., add 185 g epoxy chloropropane in droplets gradually, control the reaction temperature at 90-150° C., wait till a thickening phenomenon occurs in the reaction system, keep reaction for at least half an hour, and then add hydrochloric acid at a mole ratio of hydrochloric acid to hexamethylene diamine equal to 2:1; then, keep reaction for 4 h; thus, cationic polyamine 2 is obtained. The kinematic viscosity of cationic polyamine 2 is 460 mm$^2$/s, and the cationic degree of cationic polyamine 2 is 1.9 mmol/g.

Add 60 g triethylene tetramine in a 1,000 mL four-neck round flask, heat up to 70° C. while stirring, add 116 g epoxy butane in droplets gradually, control the reaction temperature at 60-100° C., and keep reaction for 1 h; then, heat up to 95° C., add 185 g epoxy chlorobutane in droplets gradually, control the reaction temperature at 90-150° C., wait till a thickening phenomenon occurs in the reaction system, keep reaction for at least half an hour, and then add hydrochloric acid at a mole ratio of hydrochloric acid to triethylene tetramine equal to 2:1; then, keep reaction for 4 h; thus, cationic polyamine 3 is obtained. The kinematic viscosity of cationic polyamine 3 is 410 mm²/s, and the cationic degree of cationic polyamine 3 is 1.5 mmol/g.

EXAMPLE 1

Weigh 418 g NaCl and dissolve it in 1,570 g deionized water; weigh 24 g MAPS and 64 g AM and dissolve them in the NaCl solution respectively; after the materials are dissolved fully, transfer the solution to a reactor, fill $N_2$ for 1 h for deoxidization, and heat up to 50° C. at the same time, keep reaction for 0.5 at 50° C., and then add 0.44 g ammonium persulfate, and keep reaction for 2 h; thus, a viscous intermediate product is obtained. Dissolve 17 g cationic polyamine 1 in 100 g deionized water to prepare a cationic polyamine solution; then, add the cationic polyamine solution into the intermediate product and mix to a homogeneous state, and heat up to 65° C. at the same time; next, keep reaction for 4 h. Precipitate the obtained polymer with acetone to obtain the precipitate. Dry at 110° C. for 24 h and then grind; finally, a MAPS/AM/cationic polyamine viscosity improver comprising structural A represented by formula (I-1-1), structural B represented by formula (II-2-1) and structural C represented by formula (III-2-1) is obtained.

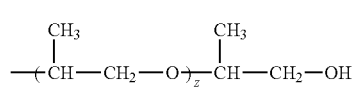

formula (IV-1)

EXAMPLE 2

Weigh 104 g $CaCl_2$ and dissolve it in 836 g deionized water; weigh 47 g MAPS and 79 g DMAM and dissolve them in the $CaCl_2$ solution respectively; after the materials are dissolved fully, transfer the solution to a reactor, fill $N_2$ for 1 h for deoxidization, and heat up to 60° C. at the same time, keep reaction for half an hour at the temperature, and then add 0.45 g sodium persulfate, and keep reaction for 1.5 h; thus, a viscous intermediate product is obtained. Dissolve 14 g cationic polyamine 2 in 100 g deionized water to prepare a cationic polyamine solution; then, add the cationic polyamine solution into the intermediate product and mix to a homogeneous state, and heat up to 70° C. at the same time; next, keep reaction for 3 h. Precipitate the obtained polymer with acetone to obtain the precipitate. Dry at 120° C. for 24 h and then grind; finally, a MAPS/DMAM/cationic polyamine viscosity improver comprising structural A represented by formula (I-1-2), structural B represented by formula (II-2-1) and structural C represented by formula (III-2-2) is obtained.

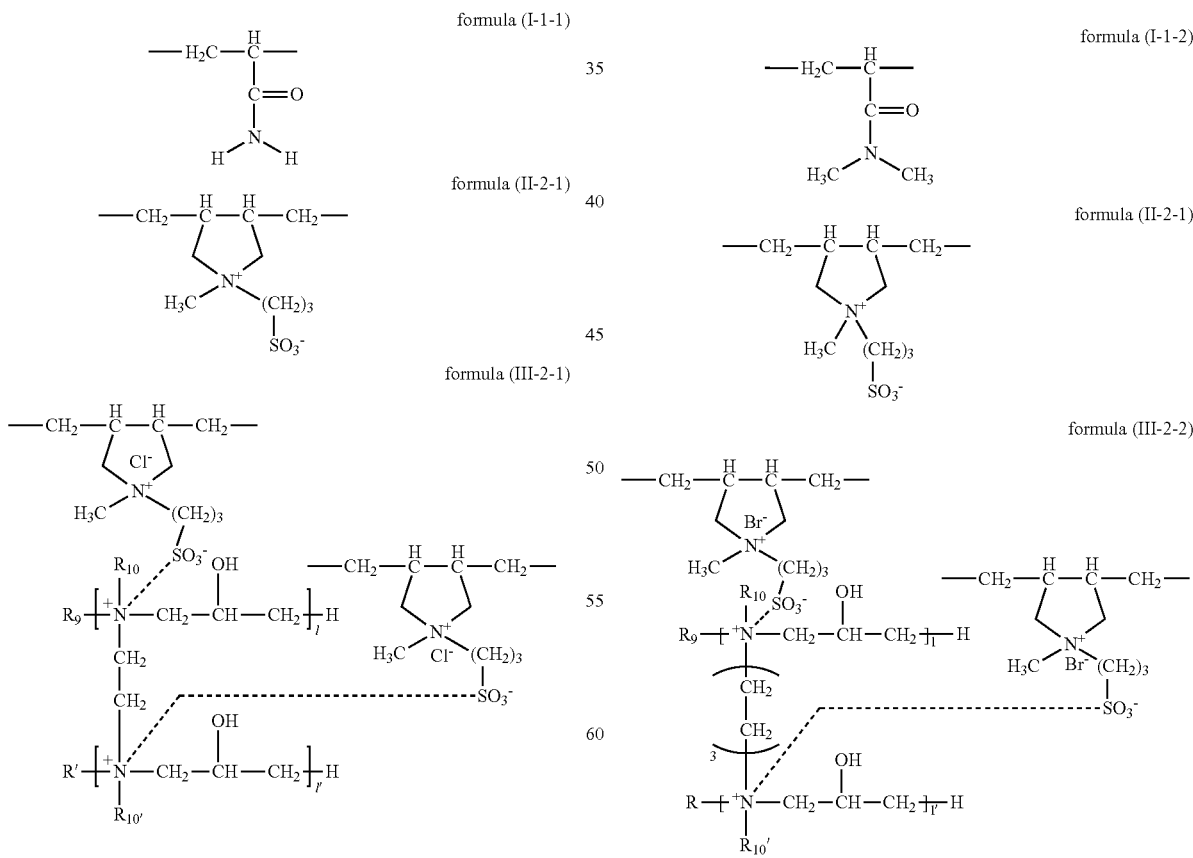

wherein, $R_9$, $R_9'$, $R_{10}$ and $R_{10}'$ independently are structure represented by formula (IV-1)

wherein, $R_9$, R, $R_{10}$ and $R_{10}'$ independently are structure represented by formula (IV-1)

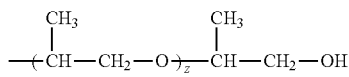

formula (IV-1)

EXAMPLE 3

Weigh 440 g NaCl and dissolve it in 1,550 g deionized water; weigh 28 g DMAPS and 64 g AM and dissolve them in the NaCl solution respectively; after the materials are dissolved fully, transfer the solution to a reactor, fill $N_2$ for 1 h for deoxidization, and heat up to 45° C. at the same time, keep reaction for half an hour at the temperature, and then add 0.45 g ammonium persulfate, and keep reaction for 1 h; thus, a viscous intermediate product is obtained. Dissolve 35 g cationic polyamine 3 in 200 g deionized water to prepare a cationic polyamine solution; then, add the cationic polyamine solution into the intermediate product and mix to a homogeneous state, and heat up to 65° C. at the same time; next, keep reaction for 5 h. Precipitate the obtained polymer with acetone to obtain the precipitate. Dry at 110° C. for 24 h and then grind; finally, a DMAPS/AM/cationic polyamine viscosity improver comprising structural A represented by formula (I-1-1), structural B represented by formula (II-1-1) and structural C represented by formula (III-1-1) is obtained.

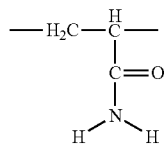

formula (I-1-1)

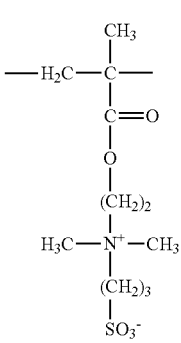

formula (II-1-1)

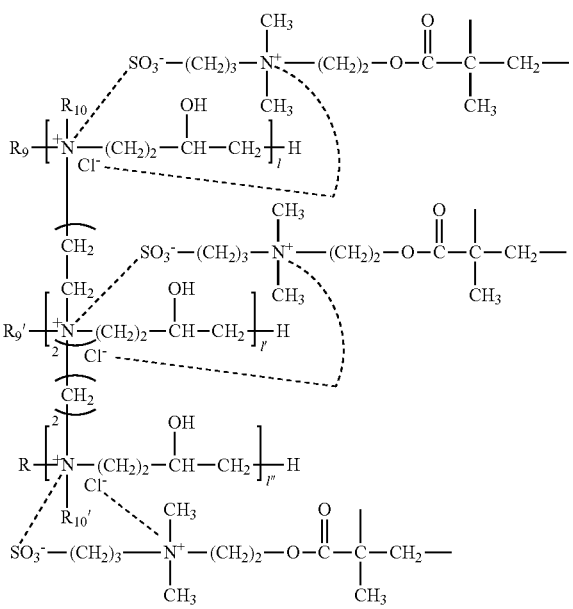

formula (III-1-1)

wherein, R, $R_9$, $R_9'$, $R_{10}$ and $R_{10}'$ independently are structure represented by formula (IV-2)

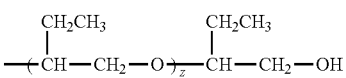

formula (IV-2)

EXAMPLE 4

Weigh 19 g $ZrCl_4$ and dissolve it in 268 g deionized water; weigh 28 g DMAPS and 64 g AM and dissolve them in the $ZrCl_4$ solution respectively; after the materials are dissolved fully, transfer the solution to a reactor, fill $N_2$ for 1 h for deoxidization, and heat up to 60° C. at the same time, keep reaction for 1 h at the temperature, and then add 0.30 g sodium persulfate, and keep reaction for 0.5 h; thus, a viscous intermediate product is obtained. Dissolve 10 g cationic polyamine 1 in 100 g deionized water to prepare a cationic polyamine solution; then, add the cationic polyamine solution into the intermediate product and mix to a homogeneous state, and heat up to 65° C. at the same time; next, keep reaction for 3.5 h. Precipitate the obtained polymer with acetone to obtain the precipitate. Dry at 110° C. for 20 h and then grind; finally, a DMAPS/AM/cationic polyamine viscosity improver is obtained.

EXAMPLE 5

Weigh 518 g NaCl and dissolve it in 1,770 g deionized water; weigh 24 g MAPS, 28 g DMAPS and 57 g AM and dissolve them in the NaCl solution respectively; after the materials are dissolved fully, transfer the solution to a reactor, fill $N_2$ for 1 h for deoxidization, and heat up to 55° C. at the same time, keep reaction for half an hour at the temperature, and then add 0.44 g ammonium persulfate, and keep reaction for 2 h for reaction; thus, a viscous intermediate product is obtained. Dissolve 62 g cationic polyamine 1 in 300 g deionized water to prepare a cationic polyamine solution; then, add the cationic polyamine solution into the intermediate product and mix to a homogeneous state, and heat up to 70° C. at the same time; next, keep reaction for 4 h. Precipitate the obtained polymer with acetone to obtain the precipitate. Dry at 110° C. for 24 h and then grind; finally, a DMAPS/MAPS/AM/cationic polyamine viscosity improver is obtained.

EXAMPLE 6

Weigh 39 g $AlCl_3$ and dissolve it in 637 g deionized water; weigh 24 g MAPS, 56 g DMAPS and 50 g AM and dissolve them in the $AlCl_3$ solution respectively; after the materials are dissolved fully, transfer the solution to a reactor, fill $N_2$ for 0.5 h for deoxidization, and heat up to 60° C. at the same time, keep reaction for 0.5 h at the temperature, and then add 0.52 g potassium persulfate, and keep reaction for 1 h; thus, a viscous intermediate product is obtained. Dissolve 4 g cationic polyamine 2 in 100 g deionized water to prepare a cationic polyamine solution; then, add the cationic polyamine solution into the intermediate product and mix to a homogeneous state, and keep reaction at 60° C. for 5 h. Precipitate the obtained polymer with acetone to obtain the precipitate. Dry at 120° C. for 16 h and then grind; finally, a DMAPS/MAPS/AM/cationic polyamine viscosity improver is obtained.

EXAMPLE 7

Weigh 104 g $CaCl_2$ and dissolve it in 836 g deionized water; weigh 45 g VPPS and 57 g AM and dissolve them in the $CaCl_2$ solution respectively; after the materials are dissolved fully, transfer the solution to a reactor, fill $N_2$ for 1 h for deoxidization, and heat up to 40° C. at the same time, keep reaction for half an hour at the temperature, and then add 0.41 g sodium persulfate, and keep reaction for 0.5 h; thus, a viscous intermediate product is obtained. Dissolve 10 g cationic polyamine 2 in 100 g deionized water to prepare a cationic polyamine solution; then, add the cationic polyamine solution into the intermediate product and mix to a homogeneous state, and heat up to 70° C. at the same time; next, keep reaction for 3.5 h. Precipitate the obtained polymer with acetone to obtain the precipitate. Dry at 120° C. for 24 h and then grind; finally, a VPPS/AM/cationic polyamine viscosity improver comprising structural A represented by formula (I-1-1), structural B represented by formula (II-3-1) and structural C represented by formula (III-3-3) is obtained.

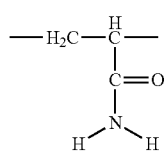

formula (I-1-1)

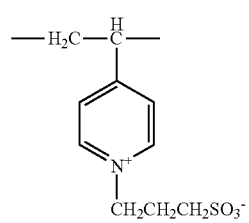

formula (II-3-1)

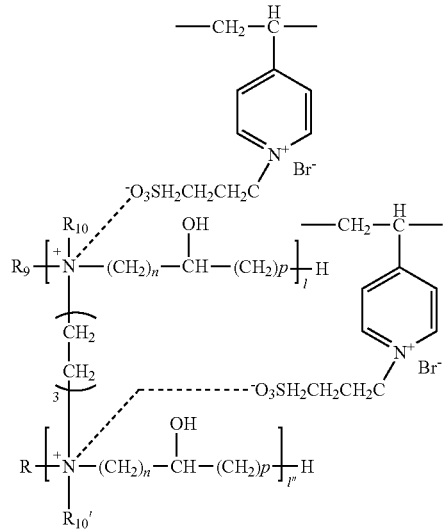

formula (III-3-3)

wherein, $R_9$, R, $R_{10}$ and $R_{10}'$ independently are structure represented by formula (IV-1)

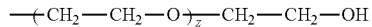

formula (IV-1)

EXAMPLE 8

Weigh 36 g $AlCl_3$ and dissolve it in 680 g deionized water; weigh 67 g VPPS and 50 g AM and dissolve them in the $AlCl_3$ solution respectively; after the materials are dissolved fully, transfer the solution to a reactor, fill $N_2$ for 1 h for deoxidization, and heat up to 55° C. at the same time, keep reaction for half an hour at the temperature, and then add 0.45 g potassium persulfate, and keep reaction for 2 h for reaction; thus, a viscous intermediate product is obtained. Dissolve 10 g cationic polyamine 3 in 100 g deionized water to prepare a cationic polyamine solution; then, add the cationic polyamine solution into the intermediate product and mix to a homogeneous state, and heat up to 65° C. at the same time; next, keep reaction for 4.5 h. Precipitate the obtained polymer with acetone to obtain the precipitate. Dry at 120° C. for 16 h and then grind; finally, a VPPS/AM/cationic polyamine viscosity improver is obtained.

EXAMPLE 9

Weigh 518 g NaCl and dissolve it in 1,870 g deionized water; weigh 22 g VPPS, 28 g DMAPS, and 57 g AM and dissolve them in the NaCl solution respectively; after the materials are dissolved fully, transfer the solution to a reactor, fill $N_2$ for 1 h for deoxidization, and heat up to 50° C. at the same time, keep reaction for half an hour at the temperature, and then add 0.46 g ammonium persulfate, and keep reaction for 1.5 h; thus, a viscous intermediate product is obtained. Dissolve 42 g cationic polyamine 3 in 200 g deionized water to prepare a cationic polyamine solution; then, add the cationic polyamine solution into the intermediate product and mix to a homogeneous state, and heat up to 65° C. at the same time; next, keep reaction for 4 h.

Precipitate the obtained polymer with acetone to obtain the precipitate. Dry at 110° C. for 24 h and then grind; finally, a DMAPS/VPPS/AM/cationic polyamine viscosity improver is obtained.

EXAMPLE 10

Weigh 39 g AlCl₃ and dissolve it in 637 g deionized water; weigh 25 g VPPS, 56 g DMAPS and 89 g DEAM and dissolve them in the AlCl₃ solution respectively; after the materials are dissolved fully, transfer the solution to a reactor, fill N₂ for 0.5 h for deoxidization, and heat up to 50° C. at the same time, keep reaction for half an hour at the temperature, and then add 0.56 g potassium persulfate, and keep reaction for 2 h for reaction; thus, a viscous intermediate product is obtained. Dissolve 22 g cationic polyamine 3 in 100 g deionized water to prepare a cationic polyamine solution; then, add the cationic polyamine solution into the intermediate product and mix to a homogeneous state, and heat up to 60° C. at the same time; next, keep reaction for 3 h. Precipitate the obtained polymer with acetone to obtain the precipitate. Dry at 120° C. for 16 h and then grind; finally, a DMAPS/VPPS/DEAM/cationic polyamine viscosity improver is obtained.

COMPARATIVE EXAMPLE 1

Prepare a copolymer with the method described in the Example 2, except that the polymerization process proceeds without inorganic salt; finally, a comparative MAPS/DMAM/cationic polyamine viscosity improver -1 is obtained.

COMPARATIVE EXAMPLE 2

Prepare a copolymer with the method described in the Example 2, except that the inorganic salt is added into the cationic polyamine solution. Specifically, the operations are as follows: Weigh 47 g MAPS and 79 g DMAM and dissolve them in the 536 g deionized water respectively; after the materials are dissolved fully, transfer the solution to a reactor, fill N₂ for 1 h for deoxidization, and heat up to 60° C. at the same time, keep reaction for half an hour at the temperature, and then add 0.45 g sodium persulfate, and keep reaction for 1.5 h; thus, a viscous intermediate product is obtained. Dissolve 14 g cationic polyamine 2 and 104 g CaCl₂ in 400 g deionized water to prepare a saline solution of cationic polyamine; then, add the saline solution of cationic polyamine into the intermediate product and mix to a homogeneous state, and heat up to 70° C. at the same time; next, keep reaction for 3 h. Precipitate the obtained polymer with acetone to obtain the precipitate. Dry at 120° C. for 24 h and then grind; finally, a MAPS/DMAM/cationic polyamine viscosity improver -2 is obtained.

COMPARATIVE EXAMPLE 3

Prepare a copolymer with the method described in the Example 2, except that no cationic polyamine is added into the viscous intermediate product obtained in the previous step; finally, a comparative MAPS/DMAM viscosity improver is obtained.

COMPARATIVE EXAMPLE 4

Dissolve 14 g cationic polyamine 2 in 100 g deionized water to prepare a cationic polyamine solution; then, add the cationic polyamine solution into the comparative MAPS/DMAM viscosity improver prepared in the Comparative example 2 and mix to a homogeneous state, and heat up to 70° C. at the same time; next, keep reaction for 3 h. Precipitate the obtained polymer with acetone to obtain the precipitate. Dry at 120° C. for 24 h and then grind; finally, a comparative MAPS/DMAM/cationic polyamine viscosity improver -3 is obtained.

COMPARATIVE EXAMPLE 5

Prepare a copolymer with the method described in the Example 3, except that the polymerization process proceeds without inorganic salt; finally, a comparative DMAPS/AM/cationic polyamine viscosity improver is obtained.

COMPARATIVE EXAMPLE 6

Prepare a copolymer with the method described in the Example 3, except that no cationic polyamine is added into the viscous intermediate product obtained in the previous step; finally, a comparative DMAPS/AM viscosity improver is obtained.

COMPARATIVE EXAMPLE 7

A viscosity improver 80A51 obtained commercially.

COMPARATIVE EXAMPLE 8

A xanthan gum viscosity improver obtained commercially.

Assessment of Performance

Assess the viscosity improving performance of the viscosity improvers obtained in the examples and comparative examples in a saliferous and calciferous base mud, with the following assessment method: Preparation of base mud: add 40 g calcium bentonite (bentonite from Liaohe Oil Field) and 5 g sodium carbonate into 1,000 mL water, agitate at 2,000 rph for 20 min., and hold and cure for 24 h at room temperature, so as to obtain a plain water base mud; add 200 g CaCl₂ into the plain water base mud, agitate at a high speed for 20 min., and then hold and cure for 24 h at room temperature, so as to obtain a base mud that contains 20 wt % CaCl₂, which is the base mud to be used in the assessment. Assessment method: take 350 mL base mud that contains 20 wt % CaCl₂, add 2% viscosity improver into the base mud, agitate at a high speed for 20 min., and keep to cure for 24 h at room temperature; then, measure the apparent viscosity. Age the obtained drilling fluid at a specific temperature for 16 h, and then measure the apparent viscosity and calculate the apparent viscosity retentivity.

TABLE 1

| Examples | Apparent Viscosity after Aging/mPa · s | Apparent Viscosity Retentivity/% | Dynamic shear force after Aging/mPa · s | Aging Temperature/° C. |
|---|---|---|---|---|
| Ex. 1 | 42 | 90.7 | 20 | 200 |
| Ex. 2 | 56 | 90.3 | 26 | 200 |
| C. E. 1 | 34 | 56.8 | 12 | 200 |
| C. E. 2 | 44 | 75.8 | 8 | 200 |
| C. E. 3 | 36 | 81.5 | 5 | 200 |

TABLE 1-continued

| Examples | Apparent Viscosity after Aging/mPa·s | Apparent Viscosity Retentivity/% | Dynamic shear force after Aging/mPa·s | Aging Temperature/°C |
|---|---|---|---|---|
| C. E. 4 | 45 | 77.9 | 7 | 200 |
| Ex. 3 | 40 | 87.6 | 18 | 200 |
| Ex. 3 | 50 | 88.4 | 20 | 200 |
| Ex. 4 | 52 | 90.0 | 24 | 200 |
| Ex. 4 | 61 | 91.9 | 30 | 200 |
| Ex. 5 | 56 | 91.0 | 25 | 200 |
| Ex. 6 | 54 | 89.6 | 22 | 200 |
| Ex. 7 | 52 | 89.7 | 24 | 200 |
| Ex. 8 | 61 | 89.7 | 30 | 200 |
| Ex. 9 | 22 | 55.3 | 10 | 200 |
| Ex. 10 | 28 | 72.3 | 6 | 200 |
| C. E. 5 | 2 | 6.25 | 0 | 200 |
| C. E. 6 | 2 | 2.78 | 0 | 200 |
| C. E. 7 | 42 | 90.7 | 20 | 200 |
| C. E. 8 | 56 | 90.3 | 26 | 200 |

Note:
In the Comparative example 8, the amount of xanthan gum is 0.5%.

It can be seen from the result in Table 1: the viscosity improver provided in the present invention still has high apparent viscosity after it is aged at a high temperature, which indicates that the viscosity improver has high temperature and salinity resistance properties; in addition, the yield point of the viscosity improver is still at a high level after the viscosity improver is aged at a high temperature, which ensures the cuttings carrying performance of the drilling fluid system at high temperatures.

What is claimed is:

1. An associated copolymer, comprising a structural unit A, a structural unit B and a structural unit C, wherein the structural unit A is represented by formula (I):

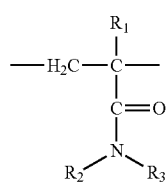

formula (I)

wherein, $R_1$, $R_2$, and $R_3$ independently are H, substituted or unsubstituted C1-C5 alkyl;

wherein the structural unit B is a Zwitter-ionic structural unit; and the cation in the Zwitter-ionic structural unit is $N^+$, and the anion in the Zwitter-ionic structural unit is $SO_3^-$;

wherein the structural unit C is an ionic associate of the structural unit B and a cationic polyamine;

wherein, based on a total weight of the associated copolymer, a weight percentage of the structural units A is 10-75 wt %; a weight percentage of the structural unit B is 15-65 wt %; and a weight percentage of the cationic polyamine is 1-50 wt %;

wherein the structural unit C is at least one of structures represented by formulae (III-1), (III-2), and (III-3):

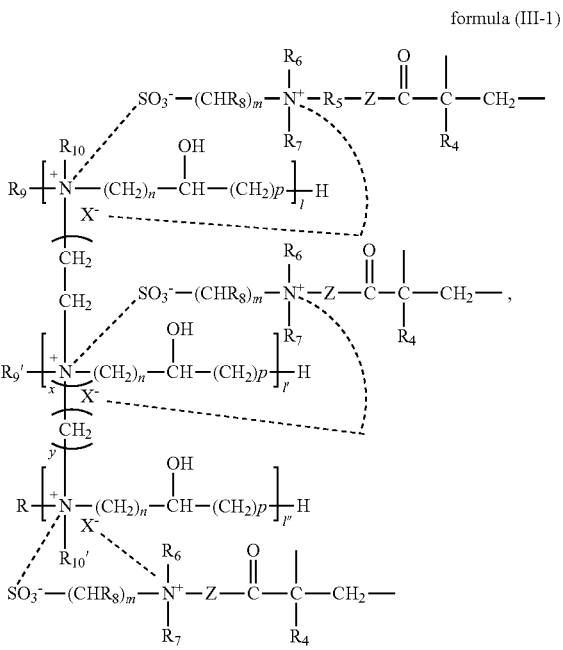

formula (III-1)

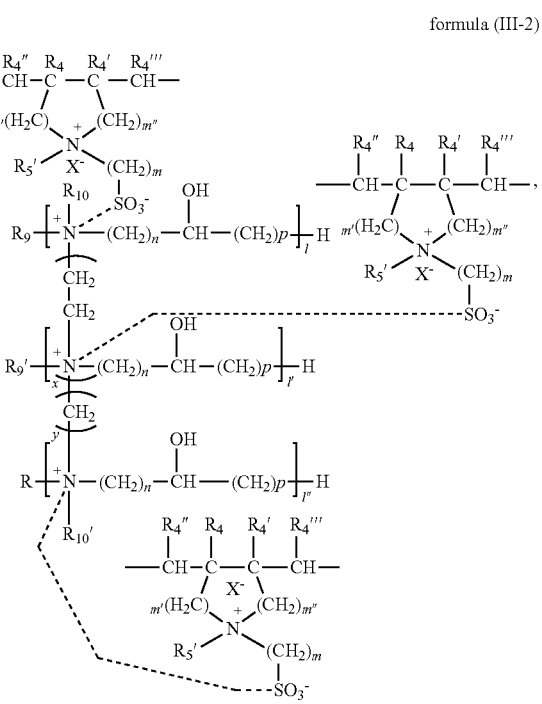

formula (III-2)

-continued

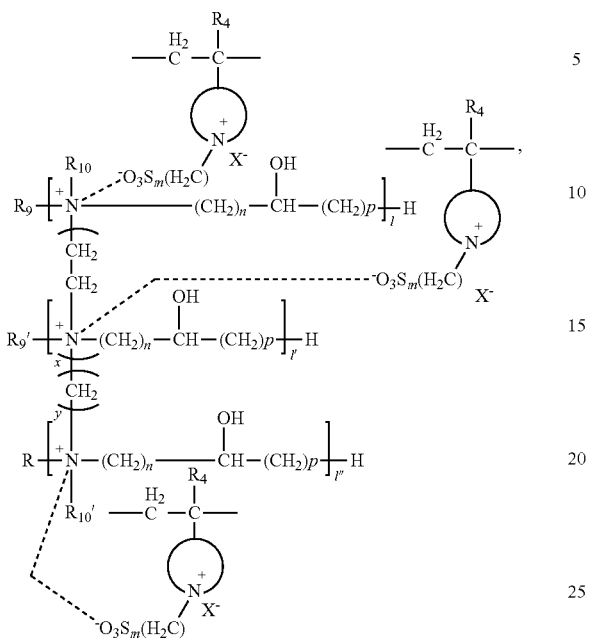
formula (III-3)

wherein, the dotted line represents ionic association; X⁻ is an inorganic anion; R, $R_9$, $R_9'$, $R_{10}$ and $R_{10}'$ independently are structures represented by formula (IV):

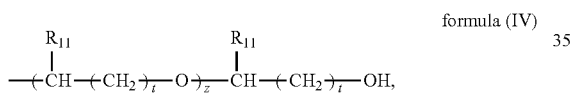
formula (IV)

wherein, $R_{11}$ is H, substituted or unsubstituted C1-C5 alkyl, t is an integer within the range of 1-5, and z is an integer within the range of 0-5; n and p independently are an integer within the range of 1-5; x is an integer within the range of 0-10; y is an integer within the range of 1-10; values of l, l' and l" are such that a kinematic viscosity of the cationic polyamine is 100-500 mm²/s and a cationic degree of the cationic polyamine is 0.5-2 mmol/g.

2. The associated copolymer according to claim 1, wherein the structural unit B is one or more of the structures represented by formulae (II-1), (II-2) and (II-3):

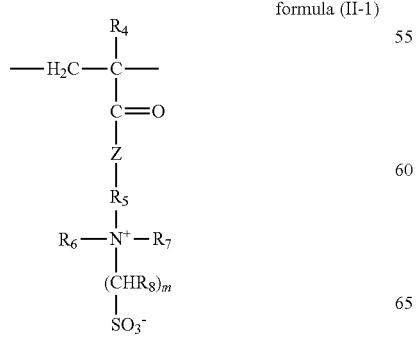
formula (II-1)

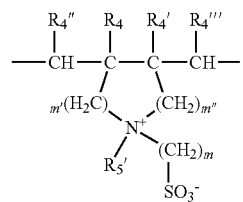
formula (II-2)

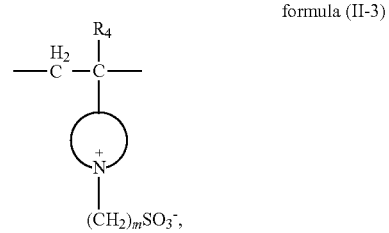
formula (II-3)

wherein, $R_4$, $R_4'$, $R_4''$, $R_4'''$, $R_5'$ and $R_8$ independently are H, substituted or unsubstituted C1-C5 alkyl;

Z is O or NH; $R_5$ is C2-C5 alkylene or C6-C10 arylene; $R_6$ and $R_7$ independently are H, substituted or unsubstituted C1-C5 alkyl;

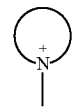

cycle is azacyclo bonded with $(CH_2)_m SO_3^-$ via a N atom;

m' and m" independently are 1 or 2; and m is an integer within the range of 1-5.

3. The associated copolymer according to claim 2, wherein the structural unit B is at least one of the structures represented by formulae (II-1-1), (II-2-1) and (II-3-1):

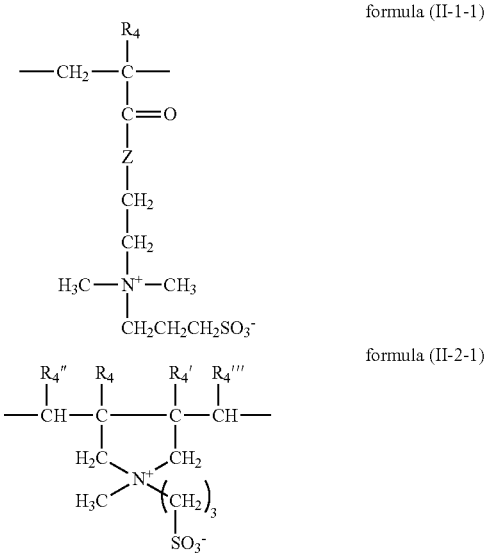
formula (II-1-1)

formula (II-2-1)

-continued

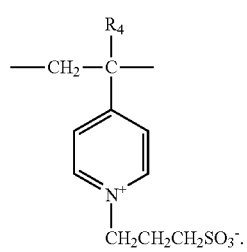

formula (II-3-1)

4. The associated copolymer according to claim 1, wherein the kinematic viscosity of the cationic polyamine is 150-450 mm²/s and the cationic degree of the cationic polyamine is 0.5-1.5 mmol/g.

5. A method for preparation of an associated copolymer of claim 1, comprising:
(1) copolymerizing a monomer a represented by formula (i) and a monomer b in an aqueous solution, with an inorganic salt in presence, to obtain a viscous intermediate product, wherein, the monomer b is a zwitter-ionic monomer; and the cation in the zwitter-ionic monomer is $N^+$, and the anion in the zwitter-ionic monomer is $SO_3^-$;
(2) contacting the viscous intermediate product obtained in step (1) with the monomer c, wherein the monomer c is cationic polyamine;

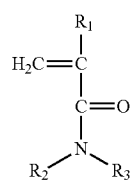

formula (i)

wherein, $R_1$, $R_2$, and $R_3$ independently are H, substituted or unsubstituted C1-C5 alkyl.

6. The method according to claim 5, wherein the weight ratio of the monomer a to the inorganic salt is 1:(0.1-6).

7. The method according to claim 5, wherein the inorganic salt is one or more of ammonium salt, calcium salt, magnesium salt, copper salt, zinc salt, aluminum salt, and zirconium salt.

8. The method according to claim 5, wherein the inorganic salt is in the aqueous solution, and when the inorganic salt is an ammonium salt, the concentration of the inorganic salt solution is 10 wt %-30 wt %;
when the inorganic salt is a calcium salt, a magnesium salt, a copper salt or a zinc salt, the concentration of the inorganic salt solution is 5 wt %-15 wt %;
when the inorganic salt is an aluminum salt, the concentration of the inorganic salt solution is 2 wt %-10 wt %; and
when the inorganic salt is a zirconium salt, the concentration of the inorganic salt solution is 2 wt %-5 wt %.

9. The method according to claim 5, wherein the copolymerization in step (1) is carried out under inert gas protection, and the conditions of the copolymerization include: copolymerization temperature being 40-60° C. and copolymerization time being 0.5-2 h.

10. The method according to claim 5, wherein based on the total weight of the monomer a, monomer b and monomer c, the amount of the monomer a is 10-75 wt %, the amount of the monomer b is 15-65 wt %, and the amount of the monomer c is 1-50 wt %.

11. The method according to claim 5, wherein the Zwitter-ionic monomer b is one or more of the structures represented by formulae (ii-1), (ii-2), and (ii-3):

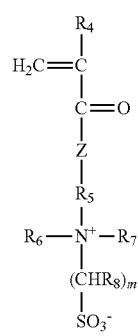

formula (ii-1)

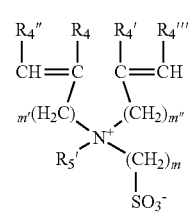

formula (ii-2)

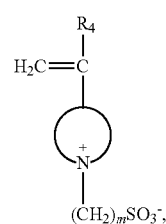

formula (ii-3)

wherein, $R_4$, $R_4'$, $R_4''$, $R_4'''$, $R_5'$ and $R_8$ independently are H, substituted or unsubstituted C1-C5 alkyl;

Z is O or NH, $R_5$ is C2-C5 alkylene or C6-C10 arylene;

$R_6$ and $R_7$ independently are H, substituted or unsubstituted C1-C5 alkyl;

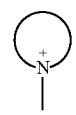

cycle is azacyclo bonded with $(CH_2)_mSO_3^-$ via a N atom;

m' and m" independently are 1 or 2 ; and m is an integer within the range of 1-5.

12. The method according to claim 5, wherein the Zwitter-ionic monomer is in at least one of the structures represented by formulae (ii-1-1), (ii-2-1) and (ii-3-1):

formula (ii-1-1)

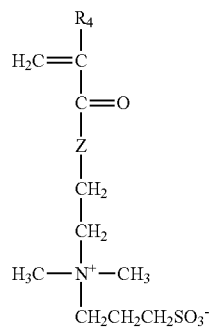

formula (ii-2-1)

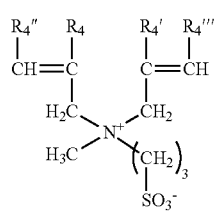

formula (ii-3-1)

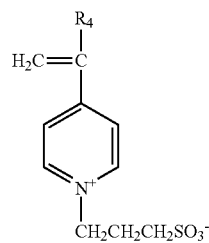

wherein, $R_4$, $R_4'$, $R_4''$, $R_4'''$ are same or different, and independently are H, substituted or unsubstituted C1-C5 alkyl.

13. The method according to claim 5, wherein the cationic polyamine has the structure represented by formula (iii):

formula (iii)

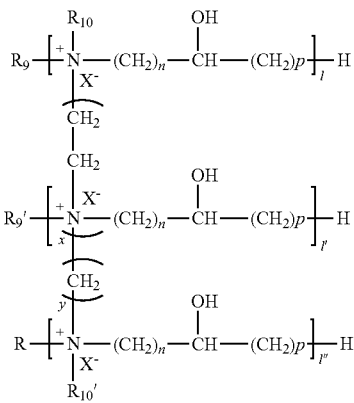

wherein, $X^-$ is an inorganic anion; R, $R_9$, $R_9'$, $R_{10}$ and $R_{10}'$ independently are the structure represented by the following formula (IV):

formula (IV)

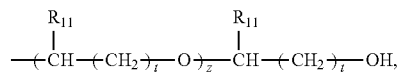

wherein, $R_{11}$ is H, substituted or unsubstituted C1-C5 alkyl, t is an integer within the range of 1-5, and z is an integer within the range of 0-5;

n and p independently are an integer within the range of 1-5; x is an integer within the range of 0-10; y is an integer within the range of 1-10; values of I, I' and I" are such that the kinematic viscosity of the cationic polyamine is 100-500 mm²/s and the cationic degree of the cationic polyamine is 0.5-2 mmol/g.

14. The method according to claim 13, wherein the kinematic viscosity of the cationic polyamine is 100-500 mm²/s and the cationic degree of the cationic polyamine is 0.5-2 mmol/g.

15. The method according to claim 5, wherein in step (2), the contact conditions include: copolymerization temperature being 50-70° C. and copolymerization time being 3-5 h.

16. A drilling fluid, comprising the associated copolymer according to claim 1.

17. A drilling fluid, comprising the associated copolymer according to claim 2.

18. The drilling fluid according to claim 16, wherein based on the total weight of the drilling fluid, the content of the associated copolymer and/or the polymer is 0.5-5 wt %.

* * * * *